United States Patent
Streuber (10) Patent No.: US 10,940,649 B2
(45) Date of Patent: Mar. 9, 2021

(54) REINFORCING STRUCTURE MADE OF A SHEET-LIKE CELLULAR BASE MATERIAL AND METHOD FOR MANUFACTURING A THREE-DIMENSIONALLY DEFORMABLE, SHEET-LIKE REINFORCING STRUCTURE

(71) Applicant: 3d | Core GmbH & Co. KG, Herford (DE)

(72) Inventor: Fritz Michael Streuber, Salzburg (AT)

(73) Assignee: 3D|Core Gmbh & Co. KG, Herford (DE)

( * ) Notice: Subject to any disclaimer, the term of this patent is extended or adjusted under 35 U.S.C. 154(b) by 184 days.

(21) Appl. No.: 16/132,901

(22) Filed: Sep. 17, 2018

(65) Prior Publication Data

US 2019/0099964 A1    Apr. 4, 2019

(30) Foreign Application Priority Data

Sep. 15, 2017   (EP) .................................... 17191495

(51) Int. Cl.
| | |
|---|---|
| *B29C 70/26* | (2006.01) |
| *B32B 3/30* | (2006.01) |
| *B32B 27/06* | (2006.01) |
| *B32B 15/04* | (2006.01) |
| *B32B 3/26* | (2006.01) |

(Continued)

(52) U.S. Cl.
CPC ............. *B29C 70/26* (2013.01); *B29B 11/02* (2013.01); *B29C 70/887* (2013.01); *B32B 3/263* (2013.01); *B32B 3/30* (2013.01); *B32B 5/18* (2013.01); *B32B 15/046* (2013.01); *B32B 27/065* (2013.01); *B29L 2031/608* (2013.01); *B32B 3/12* (2013.01); *B32B 7/12* (2013.01); *B32B 2250/40* (2013.01); *B32B 2266/025* (2013.01); *B32B 2266/0264* (2013.01); *B32B 2266/0278* (2013.01); *B32B 2307/706* (2013.01); *B32B 2419/00* (2013.01)

(58) Field of Classification Search
None
See application file for complete search history.

(56) References Cited

FOREIGN PATENT DOCUMENTS

| DE | 69129972 T2 | 2/1999 |
|---|---|---|
| EP | 0487945 B1 | 8/1998 |

(Continued)

OTHER PUBLICATIONS

Extended European Search Report re EP Patent Application No. 171914955, dated Feb. 9, 2018.

*Primary Examiner* — David Sample
*Assistant Examiner* — Elizabeth Collister
(74) *Attorney, Agent, or Firm* — Caesar Rivise, PC (57) ABSTRACT

A reinforcing structure made of a sheet-like cellular base material which comprises material attenuations (3) in a distribution over its area in a view from above, wherein the material attenuations sub-divide the base material into a multitude of material islands (1R; 1T) which are delineated from each other by the material attenuations (3) but are still connected to each other, wherein
(a) the material islands (1R; 1T) are convex base polygons in a view from above;
(b) a respective plurality of the material islands (1R; 1T) jointly form a convex and preferably regular compound polygon (1H) in a view from above; and
(c) the compound polygons (1H) differ, in their number of corners and/or in a ratio of the lengths of their sides, from the base polygons which form the material islands (1R; 1T).

10 Claims, 4 Drawing Sheets

(51) Int. Cl.
*B32B 5/18* (2006.01)
*B29B 11/02* (2006.01)
*B29C 70/88* (2006.01)
*B29L 31/60* (2006.01)
*B32B 3/12* (2006.01)
*B32B 7/12* (2006.01)

(56) References Cited

FOREIGN PATENT DOCUMENTS

| | | |
|---|---|---|
| EP | 2217436 B1 | 3/2012 |
| WO | 9810919 A2 | 3/1998 |

REINFORCING STRUCTURE MADE OF A SHEET-LIKE CELLULAR BASE MATERIAL AND METHOD FOR MANUFACTURING A THREE-DIMENSIONALLY DEFORMABLE, SHEET-LIKE REINFORCING STRUCTURE

The invention relates to a three-dimensionally deformable, sheet-like reinforcing structure and to a method for manufacturing a three-dimensionally deformable, sheet-like reinforcing structure from a sheet-like semi-finished product of a cellular base material. The base material can in particular be a foamed plastic which is reinforced with embedded structures or also a foamed plastic which is not reinforced. The invention also relates to the use of the reinforcing structure for manufacturing a composite material ("composite" for short), for which the reinforcing structure serves as a core material.

WO 98/10919 A2 and EP 2 217 436 B1 disclose cellular reinforcing structures and their use as core materials of composites. The reinforcing structures are sandwiched between cover layers of the respective composite, in order to manufacture lightweight but nonetheless rigid composites. The reinforcing structures serve as spacers for the cover layers and increase the bending resistance and buckling resistance of the composites. In order to be able to fixedly connect the cover layers of a composite, between which a reinforcing structure is inserted, to each other by means of a bonding compound, for example a glue or synthetic resin, a honeycombed reinforcing structure comprising hexagonal material islands and thin bridges connecting them to each other is used. The bonding compound permeates the cavities in the reinforcing structure which exist between the material islands in the region of the bridges, such that a material bond to the cover layers is ensured at least in the region of the cavities. Structuring the reinforcing structure into material islands and connecting bridges provides it with a flexibility such as is required for manufacturing three-dimensionally deformed composites.

The methods known from EP 2 217 436 B1, using which the cavities or other types of material attenuations are produced to a high level of precision but nonetheless economically, have proven effective in practice. In accordance with these methods, the material attenuations are incorporated into a sheet-like semi-finished product of the base material using a separating tool on which a multitude of separating elements are arranged. The fineness of the structuring is however limited by the arrangement of the separating elements on a common support and/or by the brittleness of the cellular base material.

It is an object of the invention to improve reinforcing structures of the type mentioned with regard to their flexibility, i.e. their ability to be three-dimensionally warped, and/or to enable flexible reinforcing structures of the type mentioned to be manufactured even from a comparatively brittle base material.

The invention proceeds on the basis of a three-dimensionally deformable, sheet-like reinforcing structure made of a cellular base material. The reinforcing structure comprises material attenuations, in a distribution over its area in a view from above, which can be formed as depressions, such as for example grooves, or in particular as through-slots. The material attenuations structure the cellular base material and therefore the reinforcing structure into a multitude of material islands which are delineated from each other by the material attenuations but are still connected to each other. As viewed from above, the material islands are convex polygons and preferably regular polygons. They preferably each exhibit the same size and shape. The same preferably applies to the material attenuations.

In accordance with the invention, respective groups of multiple material islands jointly form compound convex polygons. The material islands, together with the material attenuations separating them from each other and the material regions of the base material connecting them to each other, form a fine structure which is superimposed with a superstructure in the form of the larger polygons which are each composed of multiple material islands.

In preferred embodiments, the material islands of the fine structure are each rhombi or rather triangles in a view from above. In modifications, it is also possible for some of the material islands to each be shaped as a rhombus and for the remaining material islands to each be shaped as a triangle. If the material islands are formed as triangles in a view from above, they are preferably equilateral triangles. Rhombi are inherently equilateral. In such embodiments, the respective groups of rhombi and/or triangles form hexagons, preferably regular hexagons, as the compound polygons.

The subject-matter of the invention includes a method for manufacturing a three-dimensionally deformable, sheet-like reinforcing structure, wherein material attenuations are incorporated into a sheet-like cellular base material in a distribution over the area of the base material, wherein the material attenuations sub-divide the base material into a multitude of material islands which are delineated from each other by the material attenuations but are still connected to each other. The material islands are formed by the cellular base material. The material attenuations are preferably incorporated in a regular distribution, such that a correspondingly regular distribution of the material islands and therefore a correspondingly regular structuring of the reinforcing structure is obtained. As viewed from above onto the reinforcing structure, the material islands are convex polygons and preferably regular, i.e. equilateral, polygons. They are preferably rhombi and/or triangles.

In the method in accordance with the invention, the material islands are incorporated in multiple and preferably identical separating processes, and not all simultaneously but rather sequentially in respective groups of multiple material attenuations. Thus, in a first separating process, a first group of material attenuations are incorporated using separating elements which are arranged on a support of the first separating tool such that first material islands are obtained in the first process. A second group of material attenuations are incorporated in a subsequent second separating process using either the same tool or another, second separating tool which comprises separating elements which are arranged on a support of the second tool in the same way as the separating elements of the first tool. The separating elements of the second tool can be identical in shape to the separating elements of the first tool. At any rate, they are arranged on the support of the second tool in the same geometrical arrangement as the separating elements of the first tool. The two separating tools are advantageously identical to the extent that if the order of the two separating processes is inverted, i.e. if, in a modified method, the second separating process is performed before the first separating process, the same product is obtained once the two separating processes have been performed. In the second separating process, which follows the first separating process directly or after some intermediate steps, the first material islands incorporated in the first separating process are sub-divided into second material islands. In a view from above, the second material islands respectively form a convex polygon. If the second material islands form an equilateral triangle, a respective pair of second material islands can in particular together form a rhombus.

In the incorporating process, the first separating tool and the second separating tool are axially offset relative to each other in one direction and/or rotated relative to each other in relation to the base material to be processed, such that at least a subset of the second group of material attenuations exhibits a distance and/or offset from at least a subset of the first group of material attenuations, such that in the second separating process, material attenuations are obtained in addition to the material attenuations incorporated in the first separating process.

An anisotropy which inherently exists in the cellular base material in relation to mechanical strengths such as for example compression strength and shearing strength can be compensated for by the structuring in accordance with the invention, in the form of the fine structuring formed by the material islands, and the superimposed superstructure. Appropriately selecting the polygonal shape of the material islands of the fine structure and the polygonal shape of the superstructure enables advantageously small material islands and therefore a comparatively fine structuring of the reinforcing structure to be manufactured in a small number of method steps. It is also advantageous that the physically identical tool can be used or multiple identical tools can be sequentially used, each in a method step of its own, in order to incorporate the material attenuations. Incorporating the material attenuations sequentially reduces the burden acting on the cellular base material in the respective step and therefore reduces the risk of cracks or ruptures, in particular when the base material is brittle. In addition, at least some of the material attenuations can be incorporated in the second method process on the basis of the material attenuations which have already been incorporated in the first method process, and the burden acting on the base material can be further reduced.

When the material attenuations are incorporated in a batch operation, the base material can be provided in the form of a blank material which can in particular be plate-like or also, in more flexible blanks, mat-like. A flexible base material can also be a web product which is provided with the material attenuations in a continuous method. The base material can exhibit a thickness of a few millimetres, for example at least 4 mm, and a thickness of up to a few centimetres, preferably at most 20 mm. The cellular material can be predominantly open-pored or more preferably closed-pored, in order to prevent water or even moisture from entering.

Foamed plastic materials are preferred base materials, wherein foamed thermoplastic materials in particular, but also foamed thermosetting materials, can be used. Thus, for example, polyethylene terephthalate (PET) or polystyrene (PS) foams, as well as more flexible polyethylene (PE) or polypropylene (PP) foams or also, as an example of a thermosetting material, polyurethane (PUR) foams are advantageous plastic foam materials.

The plastic foam material can be reinforced, i.e. can comprise reinforcing structures embedded in the foam material, or can be used without being reinforced. The base material is preferably extruded and foamed in the process.

The structuring in accordance with the invention is also particularly suitable for reinforcing structures made of fire retardant foams and comparably brittle base material. The brittleness can have differing causes. In many cases, for instance, foaming cheap polymer material results in a brittle plastic foam and/or base material. In other cases, the brittleness is due to being adapted to a particular application, as for example in the case of fire retardant foams. The structuring in accordance with the invention makes even a brittle base material amenable to applications in which the reinforcing structure, as a constituent of a multi-layered composite material, has to be multi-dimensionally deformed when a component is shaped and/or in which an increased mechanical isotropy is required.

The material attenuations can be incorporated into the base material in the respective separating process by means of cutting and/or sawing and/or stippling. The material attenuations can accordingly be incorporated by cutting alone or by sawing alone or by stippling alone or, in accordance with preferred implementations of the method, by a multi-stage process which for example comprises and preferably consists of cutting and sawing.

A preferred multi-stage incorporating process involves cutting in accordance with the shape of the material attenuations in a first step and, after the cutting process which can itself comprise one or more stages, sawing in accordance with the shape of the material attenuations. The material attenuations are sawn out.

In the method in accordance with the invention, the statements made with respect to cutting and/or sawing and/or stippling apply to incorporating the first group of material attenuations and/or to incorporating the second group of material attenuations and/or to optionally incorporating a third group of material attenuations. The method processes which are to be performed sequentially can thus comprise one stage each or can be sub-divided within the context of the respective method process into method steps which are to be performed sequentially. Thus, for example, the first method process and/or the second method process and/or an optional third method process can for example involve a cutting process and a sawing process which are performed sequentially.

Although the material attenuations can be incorporated in the form of cavities, material attenuations which are shaped as passages are preferred, since continuous material attenuations are advantageous with regard to an ability to be three-dimensionally deformed. When manufacturing a composite, the reinforcing structure can be permeated in the region of the passages by a free-flowing bonding compound, in order to connect the cover layers of the composite in a material bond through the reinforcing structure. The passages can in particular be formed as slots and/or rows of holes.

Once the material attenuations have been incorporated, bridges remain which connect the material islands to each other. Once the material attenuations have been incorporated, these connecting bridges can preferably be compressed after the final incorporating step and thus permanently reduced in cross-section. In such embodiments, the cellular base material is compacted in the region of the bridges. The bridges are advantageously retracted from an upper side and a lower side of the reinforcing structure, such that when the reinforcing structure is embedded between two cover layers, for example two metallic cover layers or plastic layers, the bridges do not contact these cover layers. Compacting the bridges by compressing them is a cheap way of retracting the bridges from the upper side and the lower side of the reinforcing structure.

The cellular base material can also be compacted in the region of the connecting bridges by locally compressing it prior to incorporating the material attenuations, as an alternative to subsequently compressing it. Groove-shaped compaction strips can for instance be produced, before incorporating the material attenuations or at least a subset of the material attenuations, by embossing at least one of the two mutually opposing outer surfaces of the base material. The material attenuations or at least a subset of the material attenuations can advantageously be incorporated along these compaction strips. Compacting the base material beforehand facilitates incorporating the material attenuations, in particular when the base material is brittle.

The compaction strips or at least a subset of the compaction strips can advantageously each extend up to and into at least one next material attenuation. The effect of this is that bonding compound permeating into the relevant material attenuation can disperse in the compaction strip and thus be more uniformly distributed over the surface of the reinforcing structure. It is also advantageous in this regard if at least one of the two surfaces of the reinforcing structure comprises groove-shaped compaction strips in addition to material attenuations formed as passages. If material attenuations are incorporated in the region of the compaction strips, the connecting bridges obtained after the incorporating process are already compressed. Compressing before the material attenuations are incorporated can also be combined with compacting after the material attenuations have been incorporated.

When the reinforcing structure is inserted between cover layers of a composite to be manufactured, and the material attenuations are shaped as passages in the reinforcing structure, as is preferred, the material attenuations form a system of channels between the cover layers which extends continuously and unbroken over the entire area of the reinforcing structure and through which the bonding compound can accordingly permeate, parallel to the sheet-like reinforcing structure, such that the reinforcing structure is in particular suitable for being filled with bonding compound by vacuum injection, wherein the bonding compound can be injected from the side. Conversely, the composite can however also be manufactured by placing the reinforcing structure onto one of the cover layers, filling the material attenuations with the bonding compound, and placing the other cover layer onto the reinforcing structure.

In preferred embodiments, the material islands can be superficially compacted and thereby rounded on an upper side or lower side along at least some of their edges formed by incorporating the material attenuations. Rounding counters any notch effect due to sharp edges on the one hand, and enlarges the area of the material attenuations on the upper side or lower side of the reinforcing structure on the other, which advantageously enlarges the area available to the bonding compound for the material bond to the cover layers or to at least one of the cover layers and therefore increases the strength of the composite.

The cellular material can be compacted in the region of the bridges and/or compaction strips and/or the cellular material of the material islands can be superficially compacted at an ambient temperature, for example room temperature, or when the cellular material is in a heated state. It is possible to use a heated or non-heated bridge embosser in order to compact the bridges and/or compaction strips and/or to use a heated or non-heated tip embosser in order to superficially compact the material islands, including as applicable peripherally only. If the cellular material is compacted while hot, it is preferably heated to a temperature just below its melting temperature and compacted at this temperature.

A preferred manufacturing method comprises at least one separating process for each group of material attenuations, for example cutting and/or sawing and/or stippling, and at least one compacting process before and/or after this structuring process, i.e. locally compacting the cellular material in compaction strips before the material attenuations are incorporated and/or latterly in the region of the bridges and/or along the edges of the material islands.

In order to incorporate the material attenuations, multiple separating elements—for example, cutting knives or multiple saw blades or stippling needles—are arranged on a separating tool, facing an upper side of the base material, and are moved—for example, pushed—into or preferably through the base material, towards a lower side of the base material, by a movement of the tool. The term "upper side of the base material" is merely intended here to denote the side of the base material facing the separating elements and is not intended to make any assertion as to whether the separating tool is arranged vertically above or below the base material. The base material can also be processed in a vertical orientation with the separating tool arranged alongside it in such an orientation. If the base material is in the form of blanks, it expediently lies on a support base, and the separating elements are pushed downwards from above into or preferably through the base material.

The respective separating tool can be equipped with separating elements over the entire area of a starting blank of the base material and in accordance with the structuring of the reinforcing structure which is to be created, such that the separating process can be implemented in one stroke for each starting blank. In alternative embodiments, the tool comprises only one beam or other support, from which the separating elements project alongside each other in a row. Material attenuations are therefore only produced alongside each other in a row during a movement stroke, such that the separating tool has to be moved on, relative to the starting blank and transverse to the support, in order to successively incorporate one row of material attenuations after another. Instead of or, as applicable, in addition to the tool, the starting blank is preferably moved spatially, in order to incorporate one row of material attenuations after another.

If the base material is sufficiently flexible that it can be wound onto a reel even without the material attenuations, the material attenuations can be incorporated in a continuous method. If the method is implemented continuously, such materials—for example, PE or PP foams—can be unwound from a reel and guided through a roller gap formed by two rollers which rotate in opposite directions to each other or at least by a roller and a counter-pressing device which is fixed as applicable. The material attenuations are incorporated in the gap.

If, as is preferred, the respective separating process involves a cutting process and then a sawing process, the base material is preferably fed automatically to the cutting tool and then to the sawing tool, in a batch operation, for example by means of a conveyor belt or other form of continuous conveyance and in a continuous process, as a web product which is conveyed through roller gaps which are arranged sequentially in the conveying direction. If the first separating process and/or the second separating process and/or the optional third separating process involves multiple sub-steps, for example a cutting process and a sawing process, then a device for performing the respective separating process comprises a separating tool for one step and another separating tool for the other step, for example a cutting tool comprising cutting elements which form the separating elements, and a sawing tool comprising sawing elements which form the separating elements.

Advantageous details with respect to incorporating material attenuations by means of separating elements embodied as cutting knives and/or separating elements embodied as saw blades are described in EP 2 217 436 B1, which is incorporated by reference in respect of incorporating material attenuations within the context of the structuring in accordance with the invention.

The subject-matter of the invention includes a composite which comprises at least one cover layer and a reinforcing structure which is joined to the cover layer. In particular, the invention relates to a composite having a sandwich construction comprising at least two cover layers and a reinforcing structure of the type in accordance with the invention, inserted between the cover layers, as well as a bonding compound which permeates the reinforcing structure and is connected in a material bond to the two cover layers and preferably formed by a synthetic resin or a glue. The cover layers can in particular be plastic layers or also metal layers, for example light-metal layers. The composite can also comprise other cover layers and other reinforcing structures and can in particular be manufactured in a multi-sandwich construction. A double sandwich comprising three cover layers, i.e. an outer, a middle and another outer cover layer, and two reinforcing structures which are respectively arranged between one of the outer cover layers and the middle cover layer, may serve as an example.

Features of the invention are also described in the aspects formulated below. The aspects are worded in the manner of claims and can substitute for them. Features disclosed in the aspects can also supplement and/or qualify the claims, indicate alternatives with respect to individual features and/or broaden claim features. Bracketed reference signs refer to example embodiments of the invention which are illustrated below in figures. They do not restrict the features described in the aspects to their literal sense as such, but do conversely indicate preferred ways of realising the respective feature.

Aspect 1. A reinforcing structure made of a sheet-like cellular base material which comprises material attenuations (3) in a distribution over its area in a view from above, wherein the material attenuations sub-divide the base material into a multitude of material islands (1R; 1T) which are delineated from each other by the material attenuations (3) but are still connected to each other, wherein
   (a) the material islands (1R; 1T) are convex base polygons in a view from above;
   (b) a respective plurality of the material islands (1R; 1T) jointly form a convex and preferably regular compound polygon (1H) in a view from above; and
   (c) the compound polygons (1H) differ, in their number of corners and/or in a ratio of the lengths of their sides, from the base polygons which form the material islands (1R; 1T).

Aspect 2. The reinforcing structure according to Aspect 1, wherein the material islands (1R; 1T) are rhombi (1R) or triangles (1T), and the respective compound polygon (1H) is a hexagon, preferably a regular hexagon.

Aspect 3. The reinforcing structure according to at least one of the preceding aspects, wherein the material attenuations (3) or only a subset of the material attenuations (3), preferably the material attenuations (3) extending in the compound polygons (1H), each extend in a strip-shaped depression along which the cellular base material exhibits a greater density than in the remaining region of the material islands (1R; 1T).

Aspect 4. The reinforcing structure according to at least one of the preceding aspects, wherein one or more strip-shaped depressions extend(s) (respectively) on the surface of the material islands (1R) or on the surface of only a subset of the material islands (1R), wherein the strip-shaped depressions preferably each extend up to one of the material attenuations (3).

Aspect 5. The reinforcing structure according to at least one of the preceding aspects, wherein bridges (2) which connect adjacent material islands (1R; 1T) to each other remain between adjacent material attenuations (3), wherein in a preferred embodiment, a cross-sectional area of the bridges (2) is compressed and thereby reduced as compared to the material islands (1R; 1T) in the thickness direction of the reinforcing structure.

Aspect 6. A reinforcing structure made of a sheet-like cellular base material which comprises material attenuations (3) in a distribution over its area in a view from above, wherein the material attenuations sub-divide the base material into a multitude of material islands (1R; 1T) which are delineated from each other by the material attenuations (3) but are still connected to each other, wherein
   (a) the material islands (1R; 1T) are rhombi (1R) or triangles (1T) in a view from above,
   (b) and a respective plurality of the material islands (1R; 1T) jointly form a hexagon (1H), preferably a regular polygon (1H), in a view from above.

Aspect 7. A method for manufacturing a three-dimensionally deformable, sheet-like reinforcing structure, wherein
   (a) material attenuations (3) are incorporated into a sheet-like cellular base material in a distribution over the area of the base material, wherein the material attenuations sub-divide the base material into a multitude of material islands (1R; 1T) which are delineated from each other by the material attenuations (3) but are still connected to each other, wherein
   (b) in a first process, a first group (3a) of material attenuations (3) are incorporated using separating elements (5, 7) which are arranged on a support (25) of a first tool (20) such that first material islands (1H) are obtained in the first process, and
   (c) a second group (3b) of material attenuations (3) are incorporated in a subsequent second process using the separating elements (5, 7) of the first tool (20) or using separating elements (5, 7) which are arranged on a support (26) of another, second tool (21) in the same way as the separating elements (5, 7) of the first tool (20), such that the first material islands (1H) are sub-divided into second material islands (1R) which each form a convex polygon in a view from above, wherein
   (d) the second group (3b) of material attenuations (3) are incorporated such that they are uniformly offset in parallel and/or rotated relative to the first group (3a) of material attenuations (3) in a view from above, such that a respective plurality of the second material islands (1R) jointly form one of the first material islands (1H) as a convex and preferably regular compound polygon (1H) in a view from above.

Aspect 8. The method according to the preceding aspect, wherein a third group (3c) of material attenuations (3) are incorporated in yet another, third process using the separating elements (5, 7) of the first tool (20) or second tool (21) or using separating elements (5, 7) which are arranged on a support (27) of yet another, third tool (22) in the same way as the separating elements (5, 7) of the first tool (20), such that the second material islands (1R) are sub-divided into third material islands (1T) which each form a convex polygon in a view from above.

Aspect 9. The method according to any one of the immediately preceding two aspects, wherein one or more strip-shaped depressions is/are (respectively) produced by being embossed in each of the compound polygons (1H) or at least in a subset of the compound polygons (1H).

Aspect 10. The method according to the preceding aspect, wherein the one or more depressions (each) extend(s) up to and into one of the material attenuations (3).

Aspect 11. The method according to any one of the immediately preceding two aspects, wherein a respective plurality of the strip-shaped depressions extend, in the compound polygons (1H) or in at least the subset of compound polygons (1H), from a central polygonal region outwards in the shape of a star towards material attenuations (3) which define the respective compound polygon (1H).

Aspect 12. The method according to at least one of the preceding aspects, wherein the first separating process and/or the second separating process and/or the third separating process involve(s) cutting and/or sawing and/or stippling, wherein said cutting preferably involves piercing and/or said sawing preferably involves a jigsaw.

Aspect 13. The reinforcing structure according to at least one of Aspects 1 to 6, manufactured in accordance with at least one of Aspects 7 to 12.

Aspect 14. A composite, comprising:
(a) a cover layer (15);
(b) a reinforcing structure according to any one of the preceding aspects;
(c) and a bonding compound (17) which connects the cover layer (15) and the reinforcing structure in a material bond and permeates the reinforcing structure in the region of the material attenuations (3).

Aspect 15. The composite according to the preceding aspect, comprising another cover layer (16), wherein the reinforcing structure is arranged between the cover layers (15, 16), and the bonding compound (17) permeates the reinforcing structure and connects the cover layers (15, 16) in a material bond.

Preferred features are also disclosed in the sub-claims and combinations of the sub-claims.

Example embodiments of the invention are described below on the basis of figures. Features disclosed by the example embodiments, each individually and in any combination of features, advantageously develop the subject-matter of the claims and also the embodiments described above. There is shown:

Figure 1:
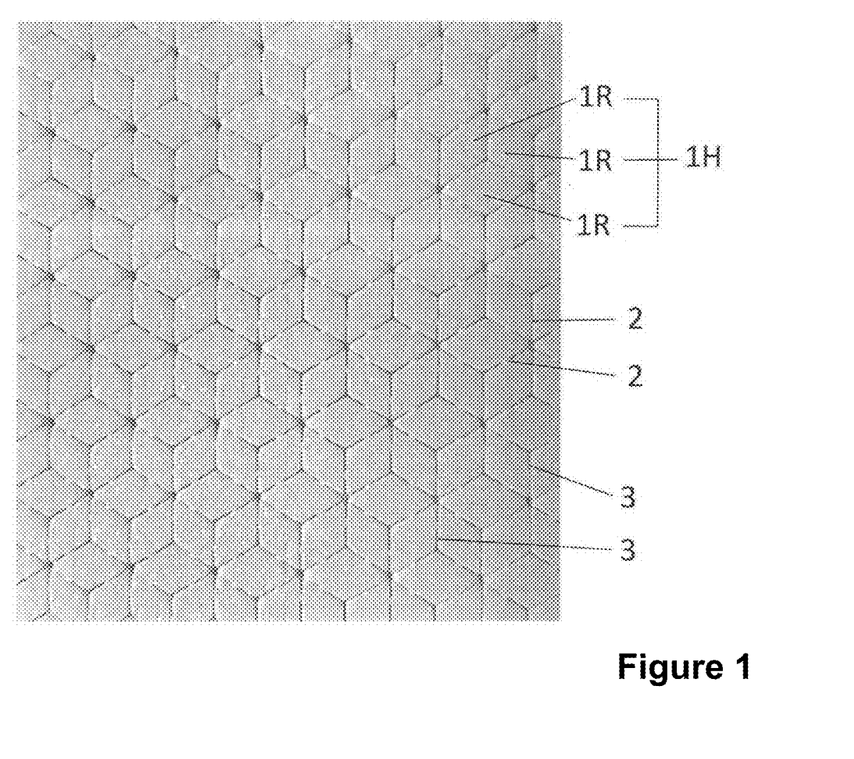
FIG. 1 a reinforcing structure of a first example embodiment, in a view from above.

FIG. 1 shows a reinforcing structure made of a cellular material, preferably a plastic foam material. Reinforcing structures, for example filaments, can be embedded in the cellular material; more preferably, however, the cellular material is not reinforced. The reinforcing structure of the first example embodiment consists of polygonal material islands 1R and comparatively thin connecting bridges 2. The material islands 1R are connected on each of their sides to the immediately adjacent material island 1R via a centred connecting bridge 2. The material islands 1R each exhibit the shape of a rhombus in a view from above. Due to their rhombic shape, each of the material islands 1R is connected to its immediately adjacent material islands 1R via four connecting bridges 2. The length and breadth of the material islands 1R are each significantly greater than the length and the thickness of the connecting bridges 2. The space between the respective immediately adjacent material islands 1R is free, aside from the connecting bridges 2. The cavities which thus remain free between the material islands 1R form material attenuations 3 as compared to a non-structured, plate-like or mat-like cellular base material. Depending on the bending resistance of the plate-like or mat-like base material, these cavities and/or material attenuations 3 facilitate its ability to be three-dimensionally deformed or only even enable its ability to be three-dimensionally deformed to any appreciable extent.

The reinforcing structure can primarily be three-dimensionally deformed, i.e. bent around multiple axes which do not point parallel to each other, by shifting the material islands 1R relative to each other, i.e. by deforming the connecting bridges 2. The reinforcing structure is therefore suitable as a core material for three-dimensionally curved lightweight composites having a sandwich construction. Axially flush material attenuations 3 respectively form a preferred bending axis of the reinforcing structure.

The material attenuations 3 also enable a bonding compound to permeate in, for example a synthetic resin compound or glue compound, via which two cover layers can be fixedly connected to each other in a material bond across the reinforcing structure 1, 2. The bonding compound fills the spaces which remain free between the material islands 1R in the region of the material attenuations 3, preferably completely, and accordingly forms a rhombically structured reinforcing structure for the cover layers in the composite when cured. While applications in composites having a sandwich construction are preferred, the reinforcing structure can however in principle also be joined to only one cover layer by means of a bonding compound, in the way described in respect of a sandwich construction, i.e. the composite can comprise a cover layer on only one flat side of the reinforcing structure.

The reinforcing structure is produced in batches from a plate-like or mat-like cellular base material, a starting blank, or continuously from a web material in multiple method steps. The starting blank or web product exhibits a material thickness corresponding at least substantially to the material islands 1R throughout. It is a homogenous, non-structured blank material or web material which however microscopically and as applicable also macroscopically comprises a cellular structure which exhibits a correspondingly low density. For the example embodiment, it may be assumed that it is a plastic foam material. Such foam materials can in particular be manufactured by extrusion and separated to form the starting blanks which are to be processed or, if the base material exhibits the appropriate flexibility, can be wound onto a reel as a web product.

The material attenuations 3 are incorporated into such a cellular base material in a multi-stage method. In a first method process, a first group of material attenuations 3 are incorporated. A second group of material attenuations 3 are incorporated in a subsequent method process. Incorporating the first group of material attenuations 3 and/or incorporating the second group of material attenuations 3 can (respectively) be sub-divided into sub-steps which are to be performed sequentially. In the first process, a superstructure consisting of convex polygons 1H is produced. In the second process, the fine structure consisting of the rhombic polygons 1R is produced. In the finished reinforcing structure of the first example embodiment, the polygons 1H are each composed of multiple material islands 1R arranged alongside each other and are therefore also referred to in the following as compound polygons 1H or as polygons 1H of the superstructure. In order to distinguish them, the material islands 1R are also referred to in the following as polygons 1R or as base polygons 1R of the fine structure.

Figure 2:
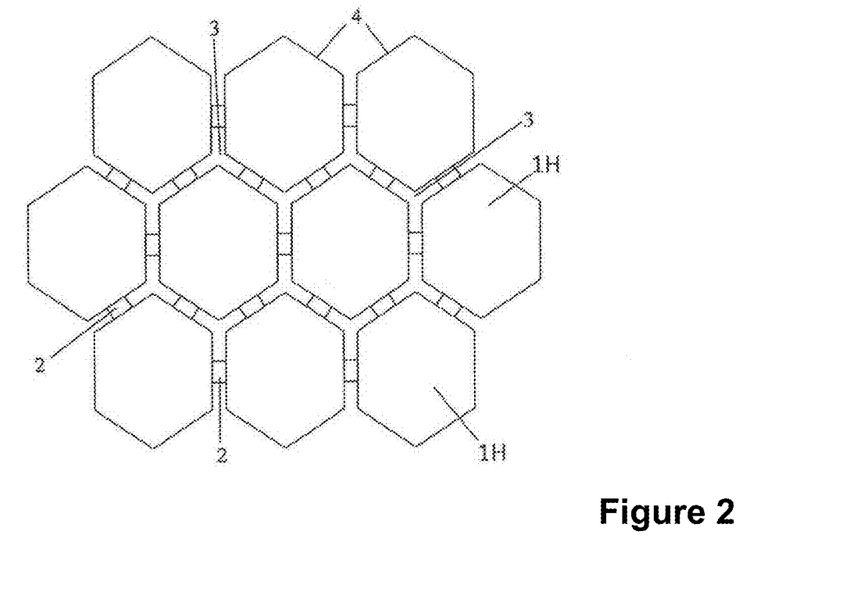
FIG. 2 a precursor structure of the reinforcing structure of the first example embodiment.

FIG. 2 shows a precursor structure which is produced in the first process and from which the reinforcing structure is produced in the subsequent second process. The precursor structure comprises material islands which are connected by connecting bridges 2 and which exhibit the outlines of the compound polygons 1H of the subsequent superstructure of the reinforcing structure. The polygons 1H are regular hexagons. They are connected on each of their sides, i.e. between their corners, to the immediately adjacent polygons 1H via connecting bridges 2 and are otherwise separated from each other by the material attenuations 3. The connecting bridges 2 and material attenuations 3 of the precursor structure are preserved in the subsequent method for manufacturing the reinforcing structure. Additional material attenuations 3 are however incorporated, and additional connecting bridges 2 thereby created, when the polygons 1H are sub-divided into the base polygons 1R by incorporating the additional material attenuations 3 in the subsequent second process.

Figure 3:
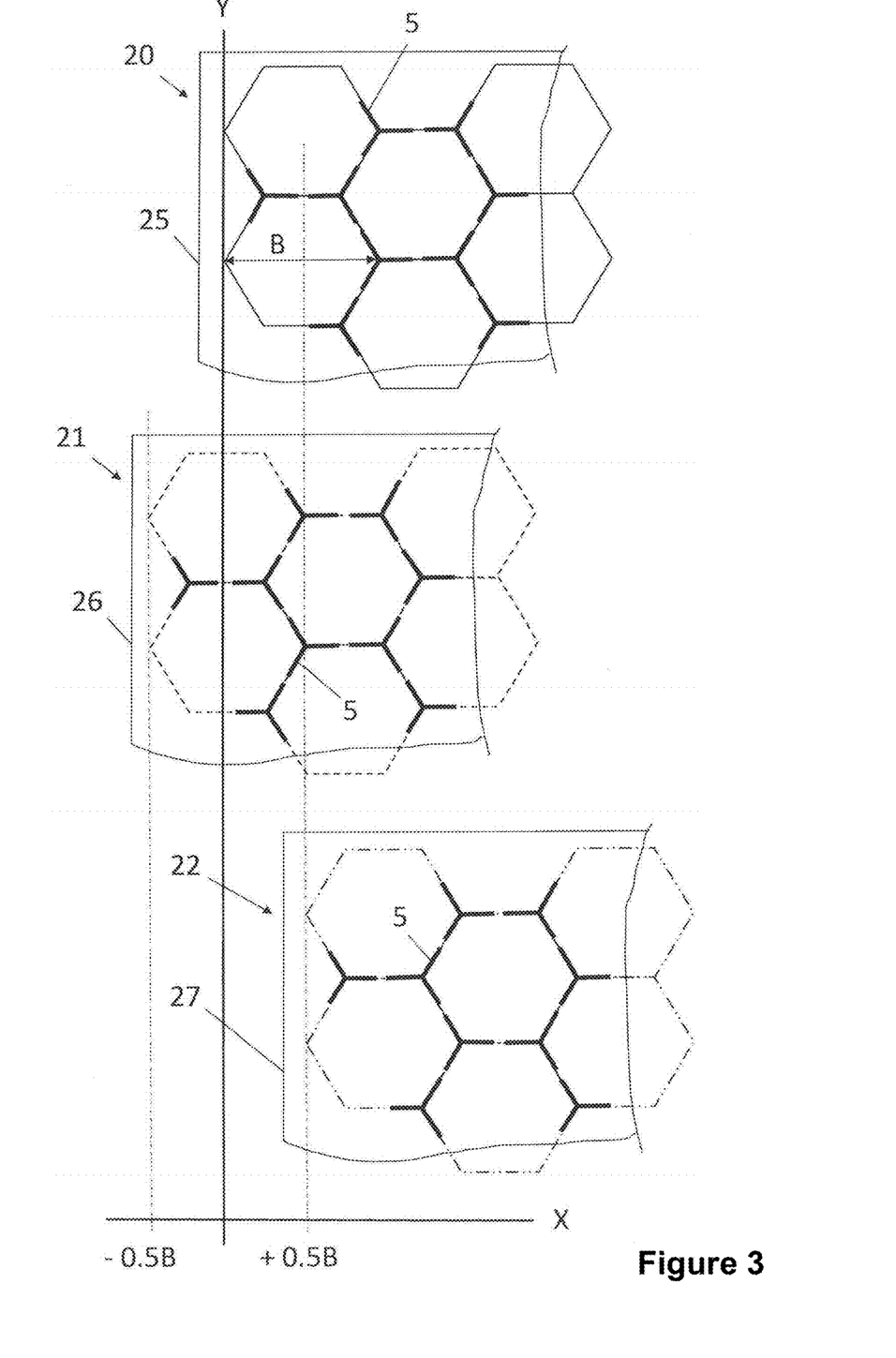
FIG. 3 separating tools for manufacturing reinforcing structures in separating processes which are to be performed sequentially.

FIG. 3 shows multiple separating tools which are each equipped with separating elements 5. They include a first separating tool 20, a second separating tool 21 and a third separating tool 22. The first separating tool 20 comprises a support 25, which can in particular be formed as a support plate or support lattice, and a plurality of separating elements 5 which are arranged on the support 25 and protrude from the support 25. The separating tool 20 serves to incorporate the first group of material attenuations 3 in the first separating process. To this end, the support 25 and a starting blank of the base material are positioned opposite each other and moved towards each other by a relative movement stroke, such that the separating elements 5 which protrude from the support 25 towards the starting blank push through the base material of the starting blank and produce the first group of material attenuations 3 in the form of passages.

The second separating tool 21 comprises a support 26 from which separating elements 5 of the second separating tool 21 protrude. Equally, the third separating tool 22 comprises a support 27 from which separating elements 5 of the third separating tool 22 protrude. The separating elements 5 of the separating tools 21 and 22 are arranged on their respective support 26 and 27 in the same way as the separating elements 5 of the first separating tool 20.

The separating elements 5 of the separating tools are each star-shaped in a view from above, as also shown in FIG. 3. They each comprise multiple (in the example embodiment, three) separating arms which project radially from a centre. The separating arms can in particular be formed as cutting knives or saw blades, as will be described further below. The arrangement of the separating elements 5 on the respective support 25, 26 and 27 is identical, at least to the extent that the supports 25, 26 and 27 which are equipped with the separating elements 5 can be positioned one above the other such that the centres of the separating elements 5 of the respective support lie flush with the centres of the separating elements 5 of the respective other supports. In the example embodiment, the separating tools 20, 21 and 22 correspond to each other to the extent that the supports 25, 26 and 27 can be positioned so as to lie one above the other such that the separating elements 5 of the respective separating tool lie flush with the separating elements 5 of the respective other separating tools. The processing tools 20, 21 and 22 accordingly comprise identical separating elements 5 in a respectively identical geometrical arrangement on the supports 25, 26 and 27.

Only two of the separating tools 20, 21 and 22, for example the separating tools 20 and 21, are required for structuring the reinforcing structure of the first example embodiment.

Thus, in the first separating process, the first group of material attenuations 3 can be incorporated into the starting blank using the first separating tool 20, thus producing the precursor structure of FIG. 2. In the subsequent second separating process, the second group of material attenuations 3 can be incorporated using the second separating tool 21. As viewed from above, the material attenuations 3 of the second group are incorporated offset with respect to the material attenuations 3 of the first group in a direction X which extends parallel to the outer sides of the polygons 1H obtained in the first separating process. For this purpose, the centres of a subset of the separating elements 5 of the second separating tool 21 are positioned flush with the centres of a subset of the material attenuations 3 created beforehand in the first separating process. If, as in the example embodiment, the separating elements 5 are arranged such that they together form regular hexagons corresponding to the hexagonal polygons 1H (FIG. 2), each second separating element 5 of the second separating tool 21 lies flush with one of the material attenuations 3 of the first group during the incorporating process in the stroke direction of the tool, circumferentially at the circumference for each hexagon and/or polygon 1H. This facilitates incorporating the relevant material attenuations 3 of the second group.

The offset which the processing tools 20 and 21 exhibit relative to each other in relation to the blank of the base material when incorporating the material attenuations 3 corresponds to half the breadth B of the hexagons and/or polygons 1H of the superstructure. The breadth B is measured between the two corners of the polygon 1H which are offset with respect to each other by 180° at the outer circumference of the respective polygon 1H. In the representation in FIG. 3, the second processing tool 21 is therefore shown offset in the X direction by −0.5 B relative to the first processing tool 20 for illustrative purposes.

Figure 4:
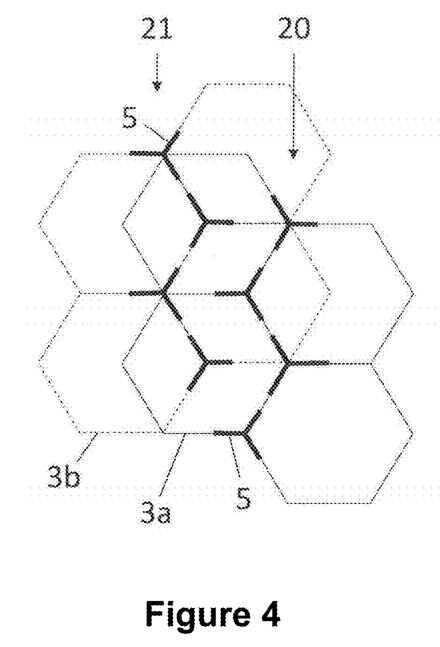
FIG. 4 the reinforcing structure of the first example embodiment, with separating elements of two separating tools positioned relative to the reinforcing structure.

The relative position which the separating tools 20 and 21 assume in the separating processes which are to be performed successively can be seen in FIG. 4. As in FIG. 3, the hexagons formed by the separating elements 5 of the separating tool 20 are shown as continuous lines, and the hexagons formed by the separating elements 5 of the separating tool 21 are shown as dashed lines. The material attenuations which are incorporated in the first separating process, i.e. the first group of material attenuations, are denoted by 3a, and the material attenuations which are incorporated in the second separating process, i.e. the second group of material attenuations, are denoted by 3b. The two groups of material attenuations 3a and 3b are identical and are denoted by 3a and 3b merely in order to distinguish them with regard to the order in which they are incorporated.

Figure 5:
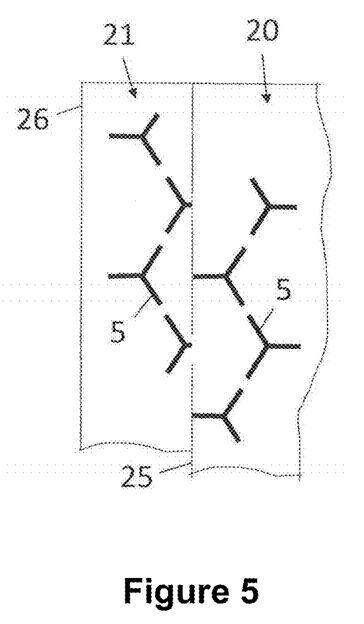
FIG. 5 two separating tools for manufacturing the reinforcing structure of the first example embodiment.

FIG. 5 shows the separating elements 5 and supports 25 and 26 of the separating tools 20 and 21 in accordance with their offset relative to each other and without the hexagons, wherein the offset relates to the base material to be processed.

Figure 6:
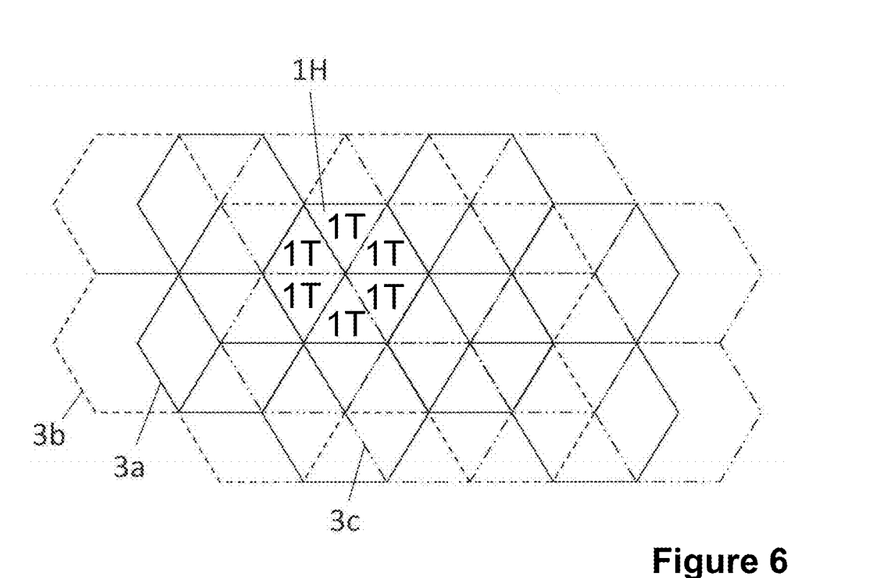
FIG. 6 a reinforcing structure of a second example embodiment, in a schematised view from above.

FIG. 6 shows a reinforcing structure of a second example embodiment which is structured even more finely than the reinforcing structure of the first example embodiment, by introducing additional material attenuations 3c. The reinforcing structure of the second example embodiment is obtained from the reinforcing structure of the first example embodiment by incorporating a third group 3c of material attenuations into the reinforcing structure of the first example embodiment.

The material attenuations 3a of the first group are indicated as continuous lines in FIG. 6. The material attenuations 3b of the second group are indicated as dashed lines. The additionally introduced material attenuations 3c of the third group are shown as dot-dashed lines. As in the first example embodiment, the material attenuations of the three groups are denoted by 3a, 3b and 3c merely in order to be able to distinguish them conceptually.

In FIG. 3, the third separating tool 22 is positioned offset in the X direction relative to the first separating tool 20 and the second separating tool 21, wherein the offset with respect to the first separating tool 20, more specifically its separating elements 5, measures +0.5 B. The offset with respect to the second separating tool 21 and/or its separating elements 5 accordingly measures B in the X direction. As a result, material attenuations 3 and/or 3a, 3b, 3c are incorporated into the same blank of the base material, using each of the separating tools 20, 21 and 22, in accordance with the superstructure shown in FIG. 2, wherein the second superstructure is offset relative to the first superstructure by half the amount of the breadth B counter to the X direction, and the third superstructure is offset relative to the first superstructure by half the magnitude of the breadth B in the X direction. In the reinforcing structure of the second example embodiment (FIG. 6), the corners of the hexagonal polygons formed using the second separating tool 21 and the third separating tool 22 abut each other at the centre of one of the respective polygons 1H produced using the first separating tool 20.

The material attenuations 3a, 3b and 3c which extend along the side edges of the triangles 1T each form a preferred bending axis of the reinforcing structure of the second example embodiment. In the second example embodiment, the mutually flush material attenuations extend along the respective bending axis continuously, while in the first example embodiment, they are regularly interrupted by intermediary rhombi 1R (FIG. 1).

Because the separating tools 20, 21 and 22 are superimposed when sequentially incorporating the three groups of material attenuations 3a, 3b and 3c, the reinforcing structure of the second example embodiment is composed of equilateral triangles 1T. The triangles 1T are connected to each other on each of their three sides by a connecting bridge corresponding to the connecting bridges 2 of FIGS. 1 and 2 and are otherwise separated from each other by the material attenuations 3a, 3b and 3c. Six of the respective triangles 1T jointly form a compound hexagonal polygon 1H.

In order to incorporate the material attenuations 3 and/or 3a, 3b, 3c, a starting blank of the base material can be positioned lying on a support base, and the separating tools 20 and 21 for manufacturing the reinforcing structure of the first example embodiment—and additionally also the separating tool 22 for manufacturing the reinforcing structure of the second example embodiment—are successively employed, with the axial offset relative to each other as shown in FIG. 3. More preferably, the separating tools—i.e. the separating tools 20 and 21 for manufacturing the reinforcing structure of the first example embodiment and the separating tools 20, 21 and 22 for manufacturing the reinforcing structure of the second example embodiment—are arranged sequentially in a production line, such that a starting blank of the base material is successively conveyed in the conveying direction X of the line to the separating tools 20 and 21 and/or 20, 21 and 22 and positioned in accordance with the axial offset of ±0.5 B relative to the separating tool 21 and/or the separating tools 21 and 22.

Figure 7:
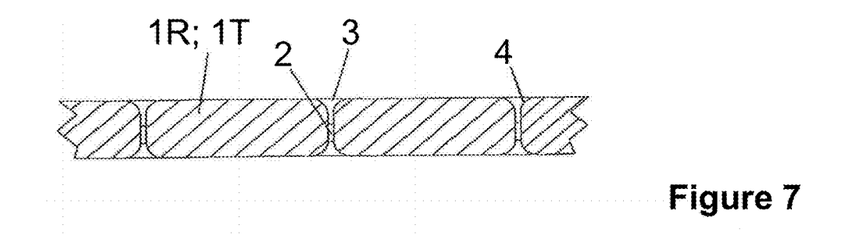
FIG. 7 one of the reinforcing structures, in a cross-section.

FIG. 7 shows one of the reinforcing structures in a non-deformed initial state in which the reinforcing structure substantially forms a plane mat or plate which is structured in accordance with the shape of the material islands 1R or 1T.

Figure 8:
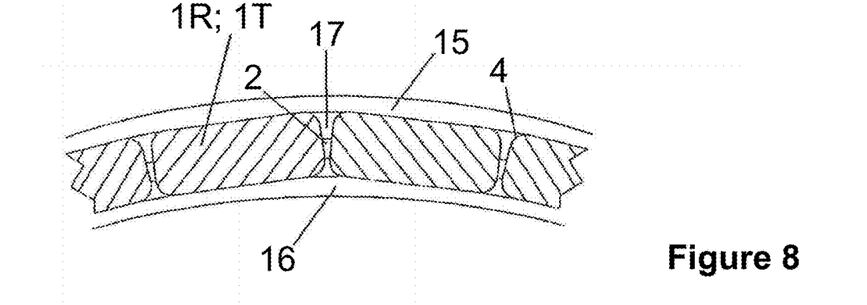
FIG. 8 a deformed composite comprising one of the reinforcing structures.

FIG. 8 shows the same reinforcing structure in a deformed state in which immediately adjacent material islands 1R or 1T point at an angle of inclination to each other due to bending of a respective connecting bridge 2 which connects them.

Once the multi-stage separating process has been completed, the connecting bridges 2 which remain between the material islands 1 and the material attenuations 3 can be compacted and thereby reduced in cross-section by compressing them, such that the compacted bridges 2 are retracted slightly from both the upper side and lower side of the material islands 1, as can be seen for example in FIGS. 7 and 8. The bridges 2 can be compacted with or without being heated. Reducing the cross-section of the bridges 2 by compressing them represents a mechanically simple method, which can therefore be performed cheaply, using which a contact area with the respective cover layer of the composite is created for the bonding compound in the region of the material attenuations 3.

Before the bridges 2 are compacted or more preferably after the bridges 2 have been compacted or even, as applicable, at the same time as they are compacted, the material islands 1R or 1T can be compacted on each of their upper side and lower side to a superficial depth range by compressing them, in order to round the edges of the material islands 1R or 1T which are still sharp-edged after the separating process. The already rounded edges are provided with the reference sign 4 in FIGS. 7 and 8. This material compaction can also be either assisted by heating the material islands 1R or 1T at least to the superficial depth range or also performed at ambient temperature by means of pressure only. Rounding the edges 4 prevents notch effects on the one hand, and on the other advantageously enlarges the contact area with the cover layer of the composite situated on the respective upper side or lower side of the reinforcing structure which is available to the bonding compound.

The first separating process and/or the second separating process and/or the third separating process can be sub-divided into multiple separating steps. Reference has already been made to sub-dividing into a cutting step and a sawing step or for example into a stippling and a sawing step. If a separating process is sub-divided into multiple separating steps, these steps are preferably performed successively in sequence. In the relevant separating process, two or more separating tools are thus employed successively, for example a cutting tool and a sawing tool. These different separating tools are each a separating tool within the meaning of the invention. If one of the groups of material attenuations is introduced in a separating process which is sub-divided into sub-steps, the other group or groups of material attenuations is/are (each) expediently also introduced in a separating process which is similarly sub-divided into sub-steps. The separating process can however also be sub-divided such that a separating process of the same type, for example a cutting process, is respectively performed in immediate succession as a first and a second and optionally a third separating process, after which a first and a second and optionally a third separating process of a respectively identical but different type, for example a sawing process, is performed again.

Figure 9:
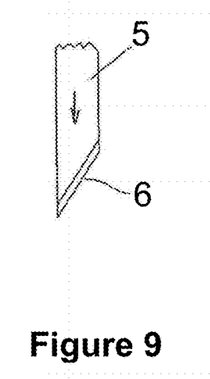
FIG. 9 a cutting knife.
Figure 10:
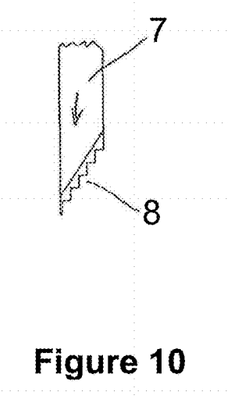
FIG. 10 a saw blade.

FIGS. 9 and 10 each show a cutting knife 5 and a saw blade 7 in a lateral view. In order to incorporate the material attenuations 3 and/or 3a, 3b, 3c, a multitude of the cutting knives 5 are arranged on a cutting tool, and an equal number of saw blades 7 are arranged on a sawing tool. The cutting tool can for example be formed by a cutting knife support, wherein the cutting knives 5 are arranged such that they project from the cutting knife support towards the base material to be processed. The sawing tool can similarly comprise such a saw blade support for the saw blades 7 which are arranged on it such that they project towards the base material. The cutting knives 5 and the saw blades 7 are arranged on their respective support in groups of three, each consisting of three cutting knives 5 or saw blades 7 which point in a Y shape with respect to each other. The respective tool can be moved back and forth in a pushing direction which is indicated on the cutting knife 5 and on the saw blade 7 by a directional arrow, such that during the respective movement stroke, the cutting knives 5 of the cutting tool or the saw blades 7 of the sawing tool are pushed in the pushing direction towards and through the base material. The cutting knives 5 each comprise a tip, which protrudes in the pushing direction, and a cutting edge 6 which is inclined from the tip with respect to the pushing direction—at a constant angle of inclination in the example embodiment—and resembles a guillotine, such that the cutting knives 5 initially pierce the base material with their tip and then cut through it progressively along the respective cutting edge 6 in order to obtain a level cut.

The sawing process is preferably performed after the cutting process, wherein the saw blades 7 are positioned exactly opposite the incorporated cuts and then moved in the pushing direction indicated, relative to the starting material provided with the cuts. The saw blades 7 are moved forwards along the cuts. Like the cutting knives 5, they also comprise a tip at their ends protruding in the pushing direction, wherein a row of saw teeth 8 which is inclined from the tip in relation to the pushing direction drops away counter to the pushing direction, like the cutting edge 6. The effect of the saw blades 7 is, in a first approximation, like that of a jigsaw, although because the row of saw teeth is inclined, a force acting in the pushing direction is sufficient to progressively widen the cut produced beforehand, starting from the respective saw blade tip, by a sawing process towards or away from a respective immediately adjacent connecting bridge 2. When sawing, the material attenuation 3 is widened in accordance with the thickness of the saw blades 7, in particular the rows of saw teeth 8.

The cutting knives 5 exhibit a breadth of preferably at least 300 µm and preferably at most 800 µm. The saw blades 7 preferably exhibit a larger breadth of preferably at least 400 µm and preferably at most 2 mm.

Figure 11:
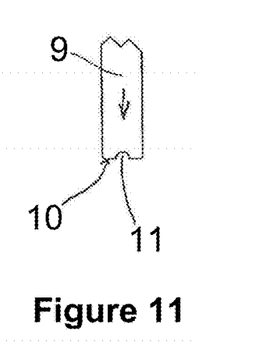
FIG. 11 a bridge embosser.

FIG. 11 shows a bridge embosser 9 using which one of the bridges 2 can be compressed and thereby compacted after the separating process, such that the cross-section of the relevant bridge 2 is permanently reduced. A lower side 10 of the bridge embosser 9, which presses against the bridge 2 when it is being compressed, comprises a central recess 11. The recess 11 is semi-cylindrical—in the example embodiment, semi-circularly cylindrical—and extends over the entire lower side 10. At the end of the compacting stroke, the compacted bridge 2 comes to rest in the recess 11. The bridges 2 are each compressed by means of two bridge embossers 9, one of which faces opposite the upper side of the reinforcing structure 1, 2 and the other of which faces opposite the lower side of the reinforcing structure 1, 2. The bridge embossers 9 are moved towards each other in pairs; one of the bridge embossers 9 can as applicable be at rest, while only the other one is moved until the relevant bridge 2 has been compacted to the desired end shape. The direction of movement of the bridge embosser 9 is indicated by a directional arrow. In a preferred embodiment, the number and arrangement of bridge embossers 9 which project from an embossing tool corresponds to the number and arrangement of the bridges 2 to be compacted. Another such embossing tool is arranged facing the other side of the reinforcing pre-structure produced by cutting and sawing. The bridge embossers 9 each exhibit a thickness which at least substantially corresponds to the length of the bridges 2.

Figure 12:
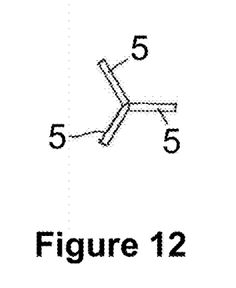
FIG. 12 a separating element formed as a star-shaped cutting element.

FIG. 12 shows one of the separating elements 5. The separating element 5 consists of three separating arms which in FIG. 12 are each formed by a cutting knife 5. The separating arms project radially outwards from a common centre, and pairs of them are at an angle of 120° with respect to each other. During the movement stroke of the separating tool equipped with the separating elements 5, the star-shaped separating elements 5 pierce through the base material with their tips, situated in the respective centre, to the fore and follow the cutting edges 6.

Figure 13:
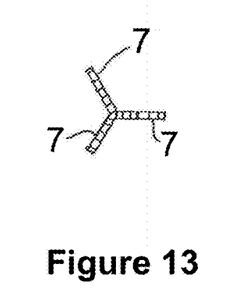
FIG. 13 a separating element formed as a star-shaped sawing element.

FIG. 13 shows a separating element 7 which is formed from multiple saw blades 7 and shaped in accordance with the separating element 5 of FIG. 12 in a view from above. The separating elements 7 are arranged on a support in accordance with the arrangement of the separating elements 5 on their support, such that when the support which is equipped with the separating elements 7 is correspondingly positioned, the separating elements 7 can enter the passages created beforehand by the separating elements 5.

The separating tools 21, 22 and 23 (FIG. 3) can each in particular be a separating tool which comprises separating elements 5 or rather separating elements 7. In FIGS. 3 to 5, the separating elements are denoted by 5 merely by way of example.

Figure 14:
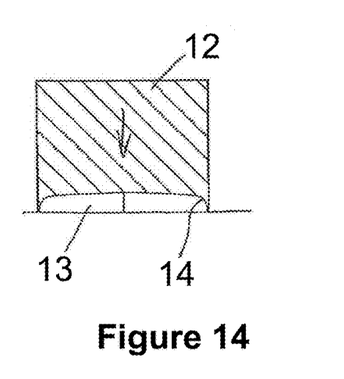
FIG. 14 a tip embosser.

FIG. 14 shows a tip embosser 12 by means of which the upper side and/or lower side of one of the material islands 1R or 1T is compacted by compressing it, wherein it is primarily compacted along the edges 4 obtained by the separating process, where this primarily causes the relevant edge 4 to be rounded. The tip embosser 12 comprises a hollow space 13 on its lower side which faces the reinforcing structure 1, 2. The hollow space 13 is trough-shaped. It accommodates the upper or lower side of one of the material islands 1 when it is being compressed. The circumferential edge 14 of the hollow space 13 tapers in a rounded curvature, the shape of which corresponds to the rounded curvature desired for the edges of the material islands 1. An embossing tool is arranged facing (each of) the upper side and/or lower side of the reinforcing structure and is equipped with a number of tip embossers 12 corresponding to the number and shape of the material islands 1. In this embossing step, the material islands 1R or 1T are compressed between the tip embossers 12 of the two tools and thereby superficially compacted at least in the region of the edges 4.

REFERENCE SIGNS 1 material island
1T base polygon, triangle
1R base polygon, rhombus
1H compound polygon, hexagon
2 bridge
3 material attenuation
3a material attenuation, first group
3b material attenuation, second group
3c material attenuation, third group
4 edge
5 cutting knife
6 cutting edge
7 saw
8 row of saw teeth
9 bridge embosser
10 lower side of the bridge embosser
11 recess of the bridge embosser
12 tip embosser
13 hollow space
14 circumferential edge
15 cover layer
16 cover layer
17 bonding compound
18
19
20 separating tool
21 separating tool
22 separating tool
23
24
25 support
26 support
27 support
B breadth

The invention claimed is:

1. A reinforcing structure made of a sheet-like cellular base material which comprises material attenuations in a distribution over its area in a view from above, wherein the material attenuations sub-divide the base material into a multitude of material islands which are delineated from each other by the material attenuations but are still connected to each other, wherein
  (a) the material islands are convex base polygons in a view from above;
  (b) a respective plurality of the material islands jointly form a convex compound polygon in a view from above; and
  (c) the compound polygons differ, in their number of corners and/or in a ratio of the lengths of their sides, from the base polygons which form the material islands,
  wherein
  (d) the material islands are rhombi or equilateral triangles, and the respective compound polygon is a regular hexagon and
  (e) wherein six of the respective triangles together form a regular hexagon.

2. The reinforcing structure according to claim 1, wherein the material attenuations or only a subset of the material attenuations each extend in a strip-shaped depression along which the cellular base material exhibits a greater density than in the remaining region of the material islands.

3. The reinforcing structure according to claim 1, wherein the material attenuations extending in the compound polygons each extend in a strip-shaped depression along which the cellular base material exhibits a greater density than in the remaining region of the material islands.

4. The reinforcing structure according to claim 1, wherein one or more strip-shaped depressions extend(s) (respectively) on the surface of the material islands or on the surface of only a subset of the material islands.

5. The reinforcing structure according to the preceding claim, wherein the strip-shaped depressions preferably each extend up to one of the material attenuations.

6. The reinforcing structure according to claim 1, wherein bridges which connect adjacent material islands to each other remain between adjacent material attenuations.

7. The reinforcing structure according to the preceding claim, wherein a cross-sectional area of the bridges is compressed and thereby reduced as compared to the material islands in the thickness direction of the reinforcing structure.

8. A reinforcing structure made of a sheet-like cellular base material which comprises material attenuations in a distribution over its area in a view from above, wherein the material attenuations sub-divide the base material into a multitude of material islands which are delineated from each other by the material attenuations but are still connected to each other, wherein
  (a) the material islands are rhombi or equilateral triangles in a view from above,
  (b) and a respective plurality of the material islands jointly form a regular hexagon in a view from above wherein
  (c) six of the respective triangles together form a regular polygon.

9. A composite, comprising:
  (a) a cover layer;
  (b) a reinforcing structure according to claim 1;
  (c) and a bonding compound which connects the cover layer and the reinforcing structure in a material bond and permeates the reinforcing structure in the region of the material attenuations.

10. The composite according to the preceding claim, comprising another cover layer, wherein the reinforcing structure is arranged between the cover layers, and the bonding compound permeates the reinforcing structure and connects the cover layers in a material bond.

* * * * *